United States Patent
Tian (10) Patent No.: US 9,207,901 B2
(45) Date of Patent: Dec. 8, 2015

(54) TASK EXECUTING METHOD AND TASK SETTING METHOD ADAPTED FOR SCREEN SAVER AND COMPUTER READABLE STORAGE MEDIUM

(71) Applicant: Wistron Corporation, New Taipei (TW)

(72) Inventor: Fu-Li Tian, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 259 days.

(21) Appl. No.: 13/798,209

(22) Filed: Mar. 13, 2013

(65) Prior Publication Data

US 2014/0157211 A1 Jun. 5, 2014

(30) Foreign Application Priority Data

Dec. 3, 2012 (CN) .......................... 2012 1 0509393

(51) Int. Cl.
*G06F 3/01* (2006.01)
*G06F 3/14* (2006.01)

(52) U.S. Cl.
CPC ............ *G06F 3/14* (2013.01); *G09G 2330/022* (2013.01)

(58) Field of Classification Search
USPC ....................................................... 715/867
See application file for complete search history.

(56) References Cited

U.S. PATENT DOCUMENTS 6,353,449 B1 * 3/2002 Gregg et al. ................... 715/762
7,827,476 B1 * 11/2010 Roberts et al. ................ 715/204

FOREIGN PATENT DOCUMENTS

| EP | 0860809 A2 | | 8/1998 | |
|---|---|---|---|---|
| WO | WO0273438 | * | 3/2002 | |
| WO | WO 0273438 | * | 3/2002 | ............. G06Q 30/00 |

OTHER PUBLICATIONS

Office action mailed on Aug. 12, 2014 for the Taiwan application No. 101147252, filing date: Dec. 13, 2012, p. 1 line 13~14, p. 2~5 and p. 6 line 1-18 15 and line 21~22.

* cited by examiner

*Primary Examiner* — Peiyong Weng
(74) *Attorney, Agent, or Firm* — Winston Hsu; Scott Margo (57) ABSTRACT

A task executing method adapted for a screen saver includes steps of opening a screen saver setting window; displaying a task setting region in the screen saver setting window, wherein the task setting region includes N first tasks and N is a positive integer; if P of the N first tasks are selected, automatically executing the P first tasks while a screen saver image starts, wherein P is a positive integer smaller than or equal to N.

18 Claims, 8 Drawing Sheets

TASK EXECUTING METHOD AND TASK SETTING METHOD ADAPTED FOR SCREEN SAVER AND COMPUTER READABLE STORAGE MEDIUM

BACKGROUND OF THE INVENTION

1. Field of the Invention

The invention relates to a task executing method and a task setting method and, more particularly, to a task executing method and a task setting method adapted for a screen saver.

2. Description of the Prior Art

As technology advances and develops, various electronic devices including personal computer, notebook, flat computer, mobile phone, personal digital assistant and so on are getting more and more popular. When using the aforesaid electronic devices, lots of tasks are usually executed at the same time. Once the system load gets too huge, some tasks will lag and the temperature of the electronic device will increase. For example, if a user uses the aforesaid electronic devices to play a video while downloading files, synchronizing data, scanning virus and so on, the video will lag so that the user will be persecuted.

In general, the aforesaid electronic devices are always equipped with a screen saver. When an input device (e.g. keyboard, mouse, touch panel, etc.) is idle for a span of time, the screen saver will start to display a screen saver image in the screen, so as to reduce power consumption. If the tasks of downloading files, synchronizing data, scanning virus and so on can be executed while the screen saver image starts, the system load can be reduced effectively while the user is using the electronic devices accordingly.

SUMMARY OF THE INVENTION

The invention provides a task executing method and a task setting method adapted for a screen saver and a computer readable storage medium, so as to solve the aforesaid problems.

According to the claimed invention, a task executing method adapted for a screen saver comprises steps of opening a screen saver setting window; displaying a task setting region in the screen saver setting window, wherein the task setting region comprises N first tasks and N is a positive integer; and if P of the N first tasks are selected, automatically executing the P first tasks while a screen saver image starts, wherein P is a positive integer smaller than or equal to N.

According to the claimed invention, the N first tasks comprises a self-defined task, the task executing method further comprises step of when the self-defined task is selected, displaying a first task selecting window, wherein the first task selecting window comprises a plurality of applications.

According to the claimed invention, the task executing method further comprises steps of after selecting the P first tasks, displaying a first task sorting window; sorting the P first tasks in the first task sorting window; and automatically executing the P first tasks after sorting while the screen saver image starts.

According to the claimed invention, the task executing method further comprises step of canceling or adding at least one first task in the first task sorting window.

According to the claimed invention, the task setting region further comprises M second tasks, M is a positive integer, the task executing method further comprises step of if Q of the M second tasks are selected, automatically executing the Q second tasks while the screen saver image exits, wherein Q is a positive integer smaller than or equal to M.

According to the claimed invention, the M second tasks comprises a self-defined task, the task executing method further comprises step of when the self-defined task is selected, displaying a second task selecting window, wherein the second task selecting window comprises a plurality of applications.

According to the claimed invention, the task executing method further comprises steps of after selecting the Q second tasks, displaying a second task sorting window; sorting the Q second tasks in the second task sorting window; and automatically executing the Q second tasks after sorting while the screen saver image exits.

According to the claimed invention, the task executing method further comprises step of canceling or adding at least one second task in the second task sorting window.

According to the claimed invention, a task setting method adapted for a screen saver comprises steps of opening a screen saver setting window; displaying a task setting region in the screen saver setting window, wherein the task setting region comprises N first tasks, the N first tasks are capable of being automatically executed while a screen saver image starts, and N is a positive integer; selecting P of the N first tasks, wherein P is a positive integer smaller than or equal to N; displaying a first task sorting window; and sorting the P first tasks in the first task sorting window.

According to the claimed invention, the task setting method further comprises step of canceling or adding at least one first task in the first task sorting window.

According to the claimed invention, the N first tasks comprises a self-defined task, the task setting method further comprises steps of selecting the self-defined task; displaying a first task selecting window, wherein the first task selecting window comprises a plurality of applications; and selecting at least one application in the first task selecting window.

According to the claimed invention, the task setting region further comprises M second tasks, the M second tasks are capable of being automatically executed while the screen saver image exits, M is a positive integer, the task setting method further comprises steps of selecting Q of the M second tasks, wherein Q is a positive integer smaller than or equal to M; displaying a second task sorting window; and sorting the Q second tasks in the second task sorting window.

According to the claimed invention, the task setting method further comprises step of canceling or adding at least one second task in the second task sorting window.

According to the claimed invention, the M second tasks comprises a self-defined task, the task setting method further comprises steps of selecting the self-defined task; displaying a second task selecting window, wherein the second task selecting window comprises a plurality of applications; and selecting at least one application in the second task selecting window.

According to the claimed invention, a computer readable storage medium for storing a set of instructions, the set of instructions executes steps of when a screen saver setting window is opened, displaying a task setting region in the screen saver setting window, wherein the task setting region comprises N first tasks and N is a positive integer; and if P of the N first tasks are selected, automatically executing the P first tasks while a screen saver image starts, wherein P is a positive integer smaller than or equal to N.

According to the claimed invention, the N first tasks comprises a self-defined task, the set of instructions executes step of when the self-defined task is selected, displaying a first task selecting window, wherein the first task selecting window comprises a plurality of applications.

According to the claimed invention, the set of instructions executes steps of after selecting the P first tasks, displaying a first task sorting window; allowing sorting the P first tasks in the first task sorting window; and automatically executing the P first tasks after sorting while the screen saver image starts.

According to the claimed invention, the set of instructions executes step of allowing canceling or adding at least one first task in the first task sorting window.

According to the claimed invention, the task setting region further comprises M second tasks, M is a positive integer, the set of instructions executes step of if Q of the M second tasks are selected, automatically executing the Q second tasks while the screen saver image exits, wherein Q is a positive integer smaller than or equal to M.

According to the claimed invention, the M second tasks comprises a self-defined task, the set of instructions executes step of when the self-defined task is selected, displaying a second task selecting window, wherein the second task selecting window comprises a plurality of applications.

According to the claimed invention, the set of instructions executing steps of after selecting the Q second tasks, displaying a second task sorting window; allowing sorting the Q second tasks in the second task sorting window; and automatically executing the Q second tasks after sorting while the screen saver image exits.

According to the claimed invention, the set of instructions executing step of allowing canceling or adding at least one second task in the second task sorting window.

As mentioned in the above, when the screen saver setting window is opened, the invention displays the first tasks (e.g. downloading files, synchronizing data, scanning virus, etc.), which can be automatically executed while the screen saver image starts, in the screen saver setting window for the user to select. Afterward, the invention will execute the selected first tasks automatically while the screen saver image starts. On the other hand, the invention stops the selected first tasks before the screen saver image starts or while the screen saver image exits. In other words, when the user is using the electronic device, the selected first tasks will not be executed. Accordingly, the system load can be reduced effectively while the user is using the electronic device. Furthermore, when the screen saver setting window is opened, the invention may further display the second tasks (e.g. opening web browser, opening video/audio player, opening real-time communication software, etc.), which can be automatically executed while the screen saver image exits, in the screen saver setting window for the user to select. Afterward, the invention will execute the selected second tasks automatically while the screen saver image exits. In other words, the selected second tasks will be executed automatically and rapidly while the screen saver image exits, so that the user needs not to execute each of the second tasks manually. Accordingly, the system efficiency can be improved effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
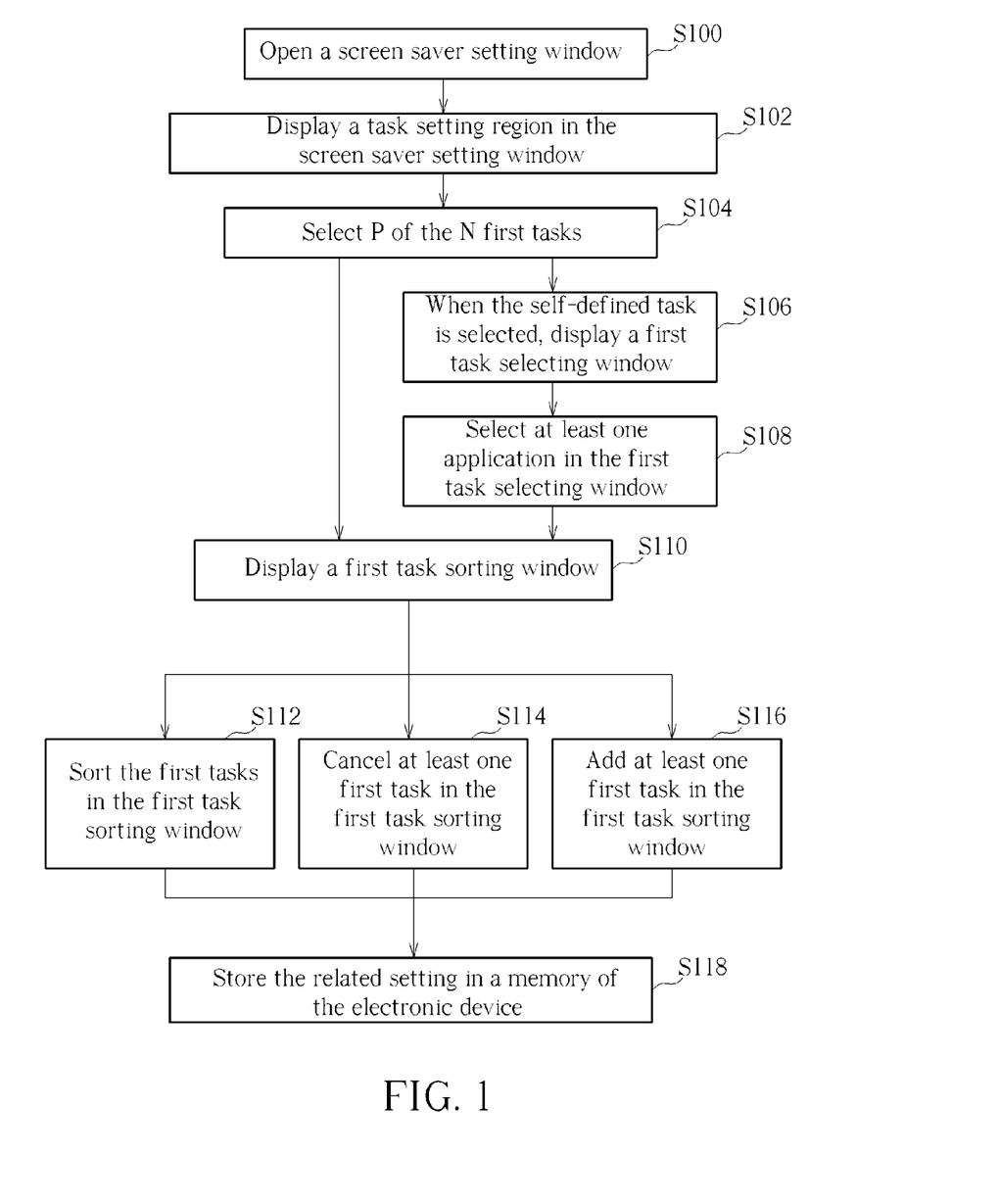
FIG. 1 is a flowchart illustrating a task setting method adapted for a screen saver and used for setting first tasks according to an embodiment of the invention.
Figure 2:
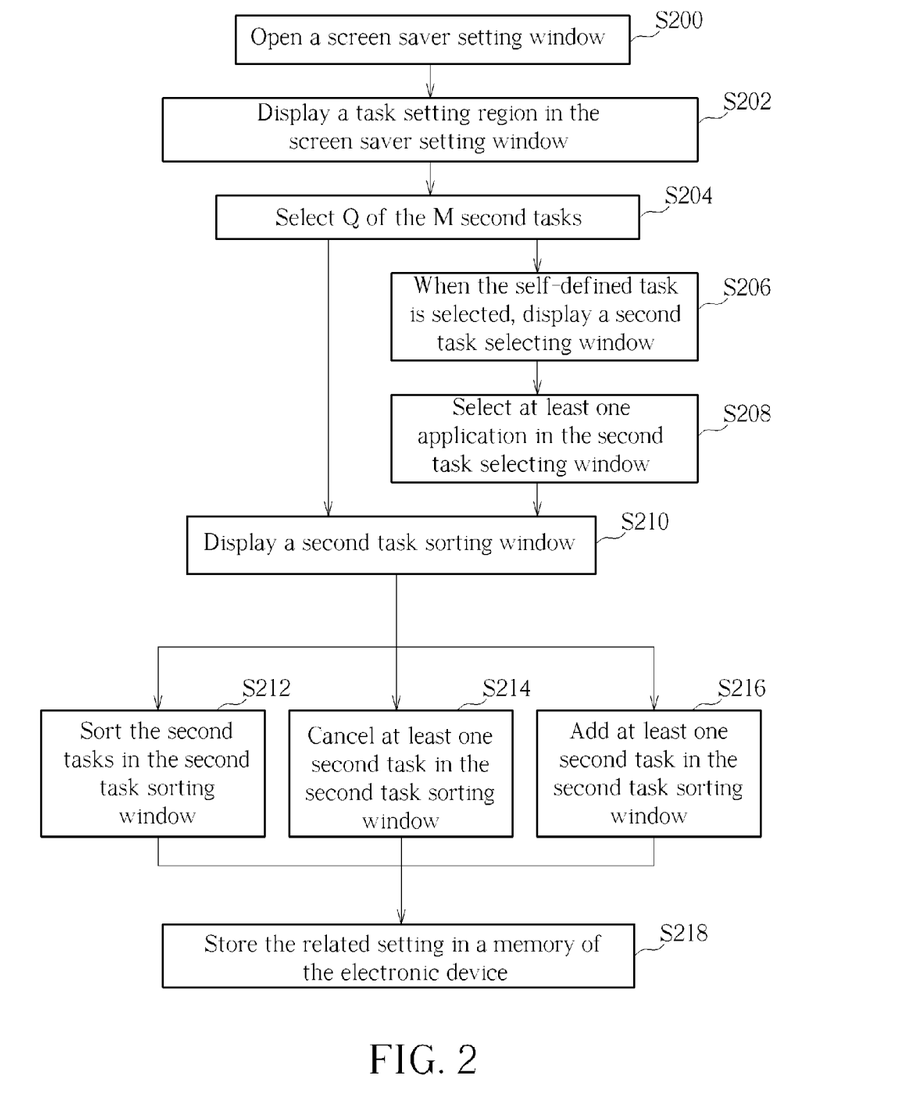
FIG. 2 is a flowchart illustrating a task setting method adapted for a screen saver and used for setting second tasks according to an embodiment of the invention.
Figure 3:
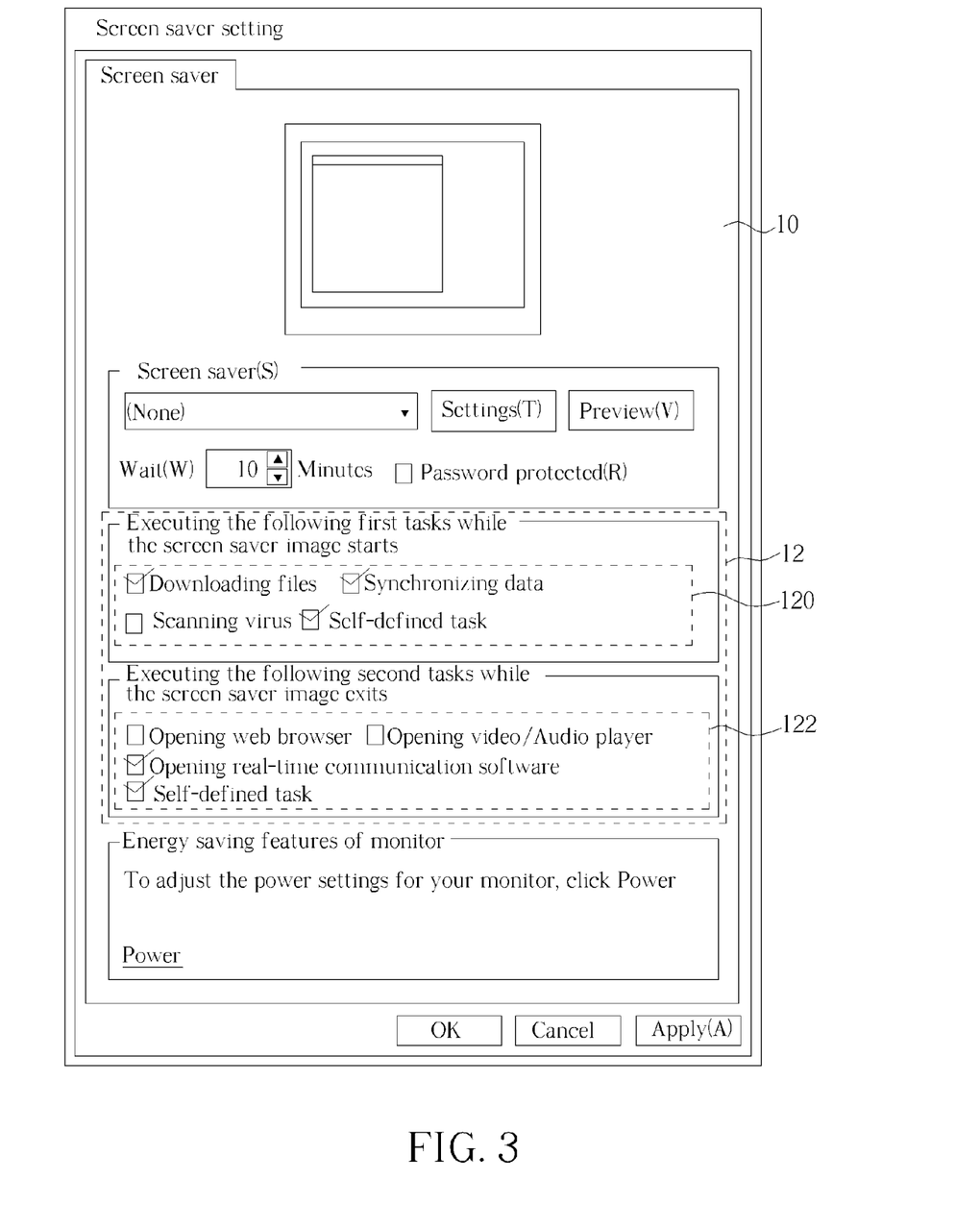
FIG. 3 is a schematic diagram illustrating a screen saver setting window and a task setting region.
Figure 4:
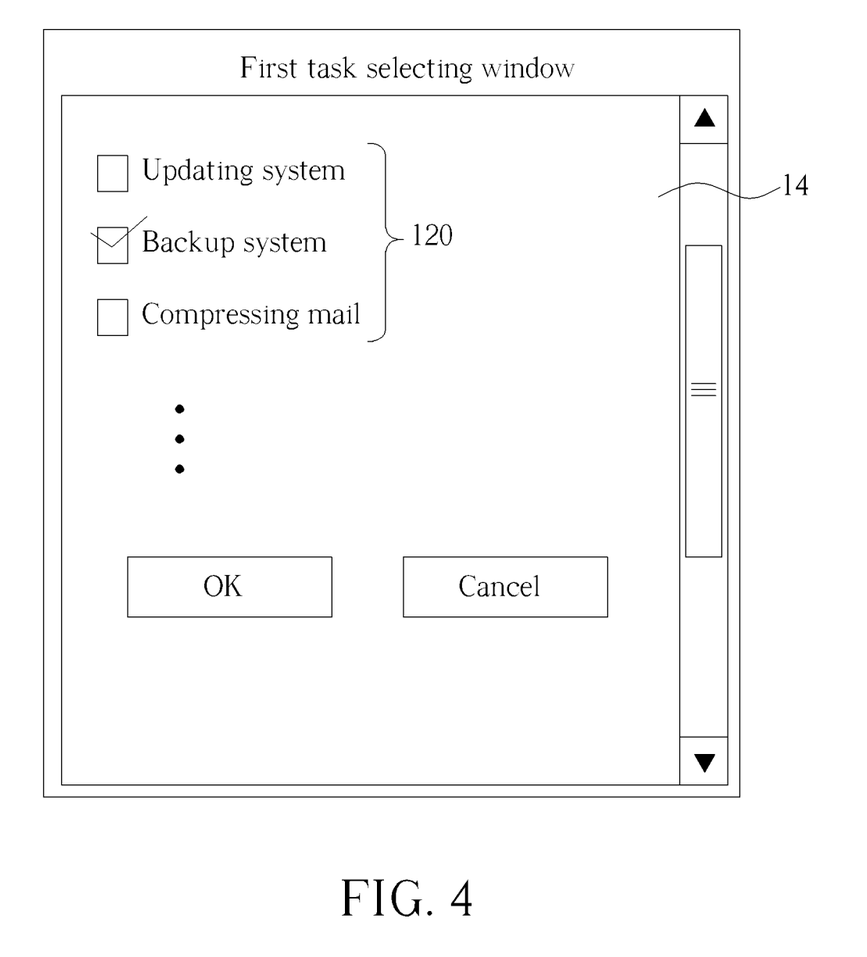
FIG. 4 is a schematic diagram illustrating a first task selecting window.
Figure 5:
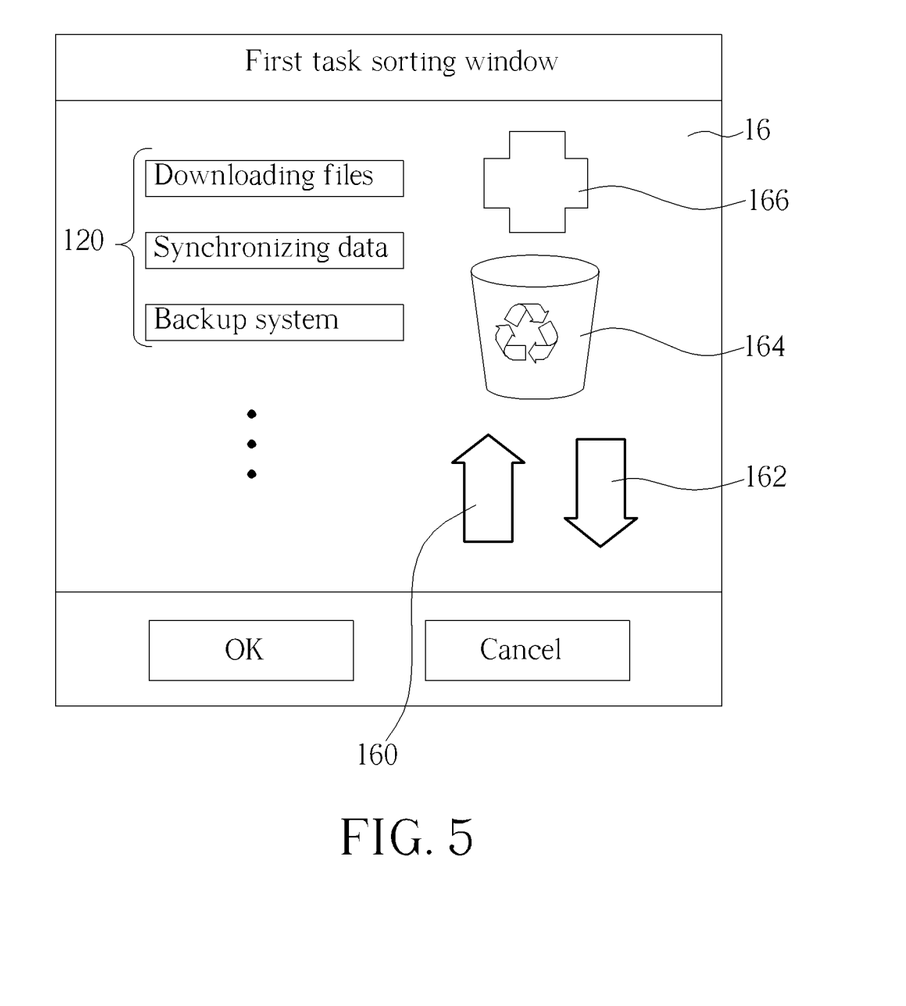
FIG. 5 is a schematic diagram illustrating a first task sorting window.
Figure 6:
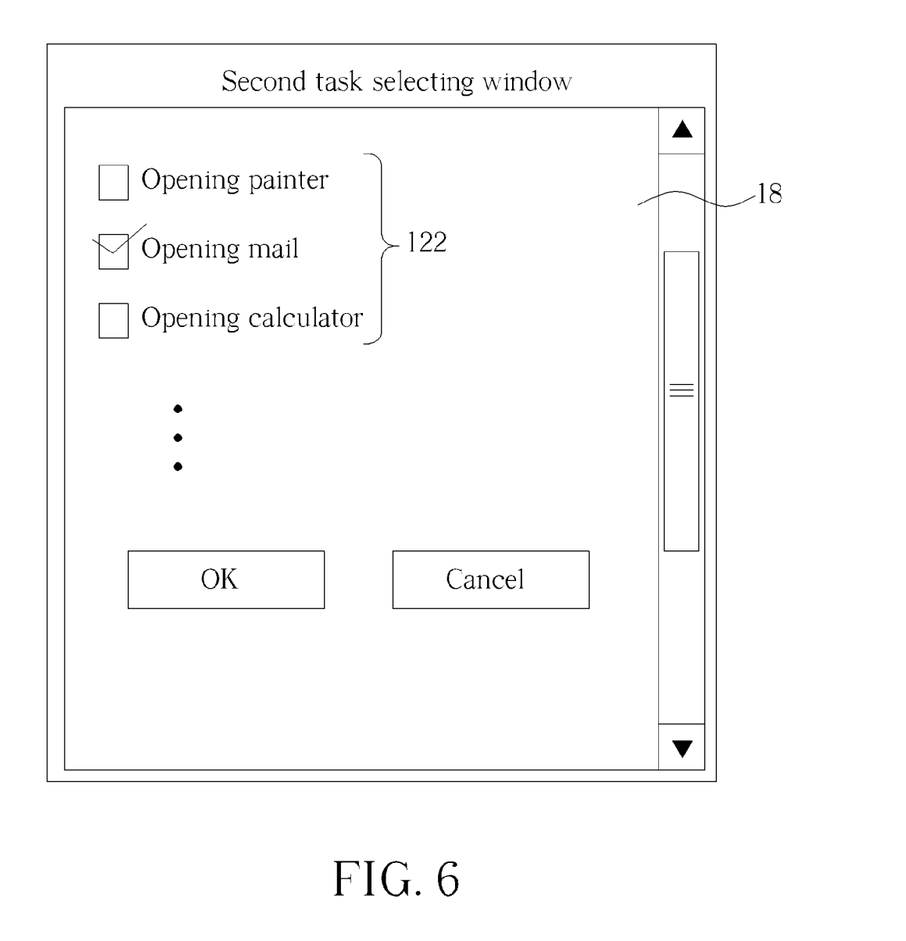
FIG. 6 is a schematic diagram illustrating a second task selecting window.
Figure 7:
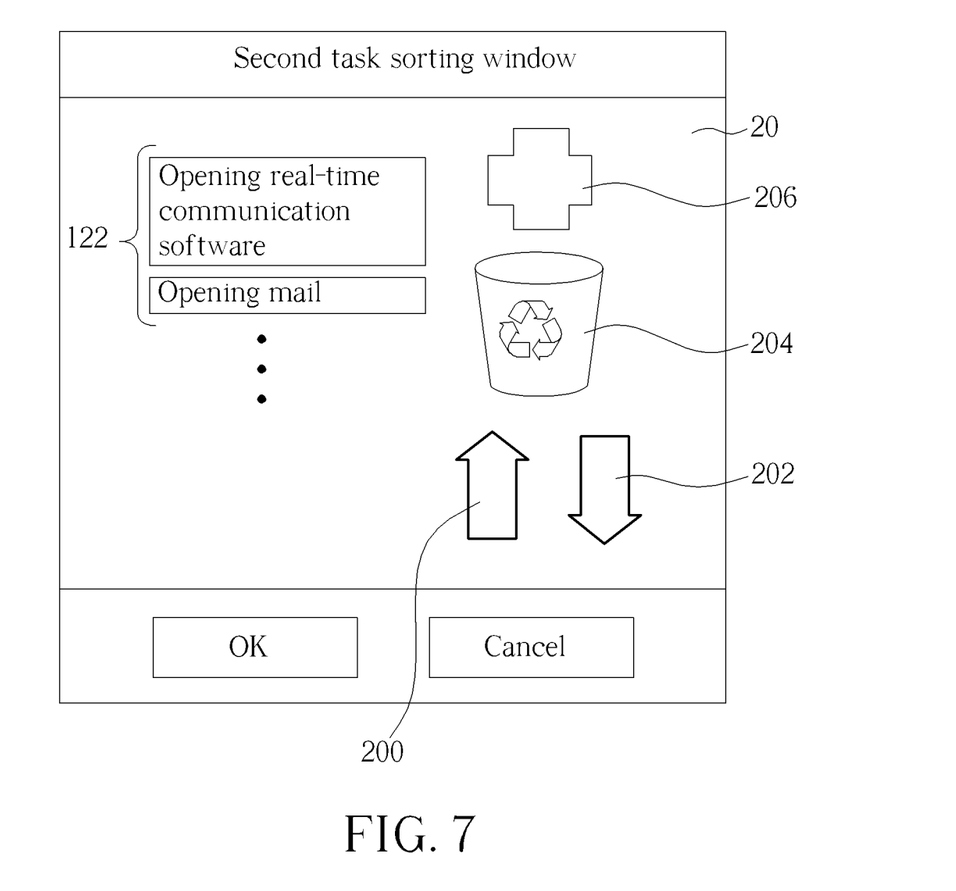
FIG. 7 is a schematic diagram illustrating a second task sorting window.

Referring to FIGS. 1 to 7, FIG. 1 is a flowchart illustrating a task setting method adapted for a screen saver and used for setting first tasks according to an embodiment of the invention, FIG. 2 is a flowchart illustrating a task setting method adapted for a screen saver and used for setting second tasks according to an embodiment of the invention, FIG. 3 is a schematic diagram illustrating a screen saver setting window 10 and a task setting region 12, FIG. 4 is a schematic diagram illustrating a first task selecting window 14, FIG. 5 is a schematic diagram illustrating a first task sorting window 16, FIG. 6 is a schematic diagram illustrating a second task selecting window 18, and FIG. 7 is a schematic diagram illustrating a second task sorting window 20. The task setting method of the invention may be implemented in an application by software programming and the application can be applied to any electronic devices equipped with a screen saver, such as personal computer, notebook, flat computer, mobile phone, personal digital assistant and so on.

First of all, a user has to install the application of the invention into an electronic device equipped with a screen saver. After starting the application of the invention, the user can open a screen saver setting window 10 as shown in FIG. 3 (step S100 in FIG. 1). At this time, the application of the invention displays a task setting region 12 in the screen saver setting window 10 as shown in FIG. 3 (step S102 in FIG. 1), wherein the task setting region 12 comprises N first tasks 120, the N first tasks 120 are capable of being automatically executed while a screen saver image starts, and N is a positive integer. In this embodiment, the N first tasks 120 may comprise a self-defined task. There are four first tasks 120 shown in FIG. 3 (i.e. N=4) for illustration purpose including downloading files, synchronizing data, scanning virus and self-defined task. However, the number and type of the first tasks 120 can be determined based on practical applications and are not limited to the embodiment shown in FIG. 3.

Furthermore, there is a rectangular frame in front of each first task 120 for the user to select. The user can operate an input device (e.g. keyboard, mouse, touch panel, etc.) to click any rectangular frame so as to select P of the N first tasks 120 (step S104 in FIG. 1), wherein P is a positive integer smaller than or equal to N. As shown in FIG. 3, three of the four first tasks 120 including downloading files, synchronizing data and self-defined task are selected (i.e. P=3). When the self-defined task is selected, the application of the invention will display a first task selecting window 14 as shown in FIG. 4 (step S106 in FIG. 1), wherein the first task selecting window 14 comprises a plurality of applications (e.g. updating system, backup system, compressing mail, etc.). Similarly, there is also a rectangular frame in front of each application in the first task selecting window 14 for the user to select. In other words, the user can operate the input device to click any rectangular frame so as to select at least one application in the first task selecting window 14 (step S108 in FIG. 1) and then increase the number and type of the aforesaid first tasks 120. It should be noted that the number and type of the applications in the first task selecting window 14 can be determined based on practical applications and are not limited to the embodiment shown in FIG. 4.

After selecting the needed applications, the user can click the OK button in the first task selecting window 14 so as to get back to the screen saver setting window 10 shown in FIG. 3. Then, the user can click the OK button in the screen saver setting window 10 such that the application of the invention will display a first task sorting window 16 as shown in FIG. 5 (step S110 in FIG. 1). It should be noted that if the user does not select the self-defined task of the first tasks 120 in step S104, he/she can click the OK button in the screen saver setting window 10 directly and then the application of the invention will display the first task sorting window 16 as shown in FIG. 5.

As shown in FIG. 5, an upward arrow icon 160 and a downward arrow icon 162 in the first task sorting window 16 are used for sorting the selected first tasks 120, a recycle bin icon 164 in the first task sorting window 16 is used for canceling the selected first tasks 120, and a crisscross icon 166 in the first task sorting window 16 is used for adding at least one first task 120. Accordingly, the user can click the upward arrow icon 160 to move anyone of the first tasks 120 upward or click the downward arrow icon 162 to move any one of the first tasks 120 downward, so as to sort each of the first tasks 120 in the first task sorting window 16 (step S112 in FIG. 1). When a screen saver image starts, the selected first tasks 120 will be executed automatically in an order from top to bottom. Furthermore, the user can click the recycle bin icon 164 to cancel at least one first task 120 in the first task sorting window 16 (step S114 in FIG. 1). Moreover, the user can click the crisscross icon 166 to add at least one first task 120 in the first task sorting window 16 (step S116 in FIG. 1). After finishing the aforesaid setting, the user can click the OK button to store the related setting in a memory of the electronic device (step S118 in FIG. 1).

When the user opens the screen saver setting window 10 as shown in FIG. 3 (step S200 in FIG. 2), the task setting region 12 in the screen saver setting window 10 may further comprise M second tasks 122, the M second tasks 122 are capable of being automatically executed while a screen saver image exits, and M is a positive integer. In this embodiment, the M second tasks 122 may comprise a self-defined task. There are four second tasks 122 shown in FIG. 3 (i.e. M=4) for illustration purpose including opening web browser, opening video/audio player, opening real-time communication software and self-defined task. However, the number and type of the second tasks 122 can be determined based on practical applications and are not limited to the embodiment shown in FIG. 3.

Furthermore, there is a rectangular frame in front of each second task 122 for the user to select. The user can operate an input device (e.g. keyboard, mouse, touch panel, etc.) to click any rectangular frame so as to select Q of the M second tasks 122 (step S204 in FIG. 2), wherein Q is a positive integer smaller than or equal to M. As shown in FIG. 3, two of the four second tasks 122 including opening real-time communication software and self-defined task are selected (i.e. Q=2). When the self-defined task is selected, the application of the invention will display a second task selecting window 18 as shown in FIG. 6 (step S206 in FIG. 2), wherein the second task selecting window 18 comprises a plurality of applications (e.g. opening painter, opening mail, opening calculator, etc.). Similarly, there is also a rectangular frame in front of each application in the second task selecting window 18 for the user to select. In other words, the user can operate the input device to click any rectangular frame so as to select at least one application in the second task selecting window 18 (step S208 in FIG. 2) and then increase the number and type of the aforesaid second tasks 122. It should be noted that the number and type of the applications in the second task selecting window 18 can be determined based on practical applications and are not limited to the embodiment shown in FIG. 6.

After selecting the needed applications, the user can click the OK button in the second task selecting window 18 so as to get back to the screen saver setting window 10 shown in FIG. 3. Then, the user can click the OK button in the screen saver setting window 10 such that the application of the invention will display a second task sorting window 20 as shown in FIG. 7 (step S210 in FIG. 2). It should be noted that if the user does not select the self-defined task of the second tasks 122 in step S204, he/she can click the OK button in the screen saver setting window 10 directly and then the application of the invention will display the second task sorting window 20 as shown in FIG. 7.

As shown in FIG. 7, an upward arrow icon 200 and a downward arrow icon 202 in the second task sorting window 20 are used for sorting the selected second tasks 122, a recycle bin icon 204 in the second task sorting window 20 is used for canceling the selected second tasks 122, and a crisscross icon 206 in the second task sorting window 20 is used for adding at least one second task 122. Accordingly, the user can click the upward arrow icon 200 to move anyone of the second tasks 122 upward or click the downward arrow icon 202 to move any one of the second tasks 122 downward, so as to sort each of the second tasks 122 in the second task sorting window 20 (step S212 in FIG. 2). When a screen saver image exits, the selected second tasks 122 will be executed automatically in an order from top to bottom. Furthermore, the user can click the recycle bin icon 204 to cancel at least one second task 122 in the second task sorting window 20 (step S214 in FIG. 2). Moreover, the user can click the crisscross icon 206 to add at least one second task 122 in the second task sorting window 20 (step S216 in FIG. 2). After finishing the aforesaid setting, the user can click the OK button to store the related setting in a memory of the electronic device (step S218 in FIG. 2).

Figure 8:
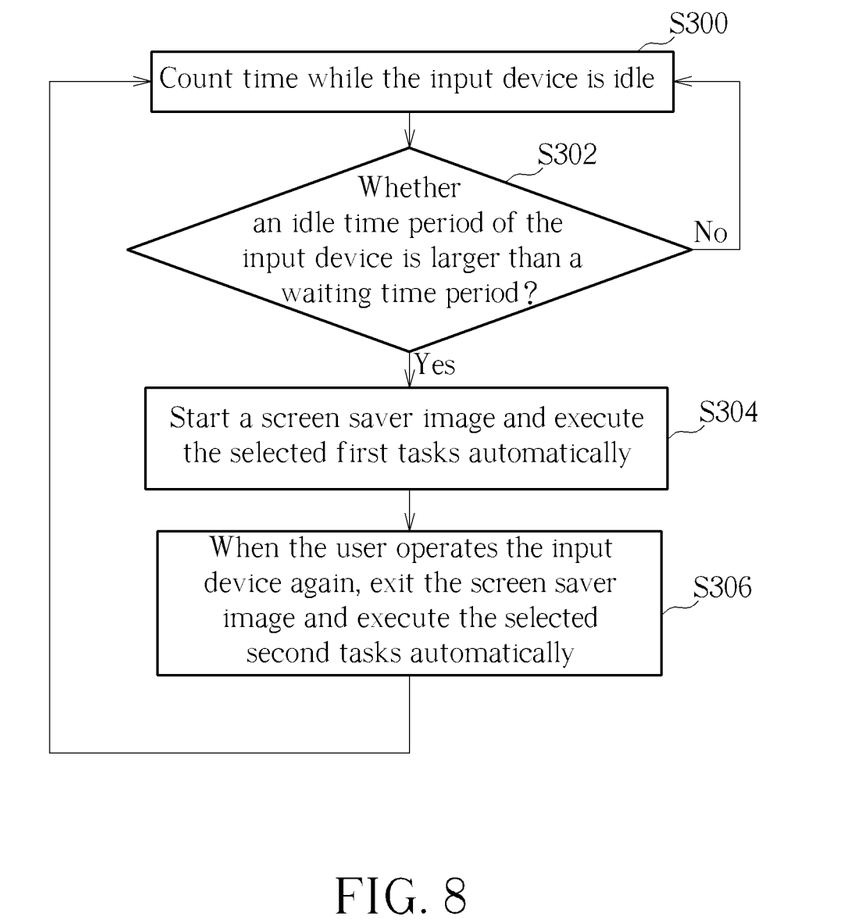
FIG. 8 is a flowchart illustrating a task executing method adapted for a screen saver according to an embodiment of the invention.

Referring to FIG. 8, FIG. 8 is a flowchart illustrating a task executing method adapted for a screen saver according to an embodiment of the invention. The task executing method shown in FIG. 8 can be implemented with the task setting method shown in FIGS. 1 and 2. After storing the related setting in the memory of the electronic device (step S118 in FIG. 1 and step S218 in FIG. 2), a timer of the electronic device will start to count time while the input device is idle (step S300 in FIG. 8). Afterward, a processor of the electronic device will determine that whether an idle time period of the input device is larger than a waiting time period (step S302 in FIG. 8), wherein the waiting time period may be set by the user in the screen saver setting window 10 shown in FIG. 3. If the idle time period of the input device is not larger than the waiting time period, go back to step S300 and count time continuously. If the idle time period of the input device has been larger than the waiting time period, a screen saver image will start in the screen and the selected first tasks 120 will be automatically executed at the same time (step S304 in FIG. 8). For example, if the user selects the first tasks 120 of downloading files, synchronizing data and backup system according to the aforesaid task setting method, the selected first tasks 120 will be executed automatically while the screen saver image starts.

When the user operates the input device again, the screen saver image will exit from the screen and the selected second tasks 122 will be automatically executed at the same time (step S306 in FIG. 8). For example, if the user selects the second tasks 122 of opening real-time communication software and opening mail according to the aforesaid task setting method, the selected second tasks 122 will be executed automatically and the selected first tasks 120 will be stopped while the screen saver image exits. In other words, when the user is using the electronic device, the selected first tasks 120 will not be executed. Accordingly, the system load can be reduced effectively while the user is using the electronic device. Furthermore, when the screen saver image exits, the selected second tasks will be executed automatically and rapidly, so that the user needs not to execute each of the second tasks manually. Accordingly, the system efficiency can be improved effectively.

It should be noted that the control logic of the task setting methods shown in FIGS. 1 and 2 and the task executing method shown in FIG. 8 can be implemented by software. The software can be executed in any electronic devices equipped with a screen saver. Needless to say, each part or function of the control logic may be implemented by software, hardware or the combination thereof. Moreover, the control logic of the task setting methods shown in FIGS. 1 and 2 and the task executing method shown in FIG. 8 can be embodied by a computer readable storage medium, wherein the computer readable storage medium stores instructions, which can be executed by an electronic device so as to generate control command for executing corresponding function.

As mentioned in the above, when the screen saver setting window is opened, the invention displays the first tasks (e.g. downloading files, synchronizing data, scanning virus, etc.), which can be automatically executed while the screen saver image starts, in the screen saver setting window for the user to select. Afterward, the invention will execute the selected first tasks automatically while the screen saver image starts. On the other hand, the invention stops the selected first tasks before the screen saver image starts or while the screen saver image exits. In other words, when the user is using the electronic device, the selected first tasks will not be executed. Accordingly, the system load can be reduced effectively while the user is using the electronic device. Furthermore, when the screen saver setting window is opened, the invention may further display the second tasks (e.g. opening web browser, opening video/audio player, opening real-time communication software, etc.), which can be automatically executed while the screen saver image exits, in the screen saver setting window for the user to select. Afterward, the invention will execute the selected second tasks automatically while the screen saver image exits. In other words, the selected second tasks will be executed automatically and rapidly while the screen saver image exits, so that the user needs not to execute each of the second tasks manually. Accordingly, the system efficiency can be improved effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A task executing method adapted for a screen saver comprising steps of:
   opening a screen saver setting window;
   displaying a task setting region in the screen saver setting window, wherein the task setting region comprises N first tasks comprising a self-defined task, the N first tasks are tasks not involving any screen saver image, and N is a positive integer;
   if P of the N first tasks are selected, automatically executing the P first tasks while a screen saver image starts, wherein P is a positive integer smaller than or equal to N;
   when the self-defined task is selected, displaying a first task selecting window, wherein the first task selecting window comprises a plurality of applications;
   after selecting the P first tasks, displaying a first task sorting window;
   sorting the P first tasks in the first task sorting window; and
   automatically executing the P first tasks after sorting while the screen saver image starts.

2. The task executing method of claim 1, further comprising step of:
   canceling or adding at least one first task in the first task sorting window.

3. The task executing method of claim 1, wherein the task setting region further comprises M second tasks, M is a positive integer, the task executing method further comprises step of:
   if Q of the M second tasks are selected, automatically executing the Q second tasks while the screen saver image exits, wherein Q is a positive integer smaller than or equal to M.

4. The task executing method of claim 3, wherein the M second tasks comprises a self-defined task, the task executing method further comprises step of:
   when the self-defined task is selected, displaying a second task selecting window, wherein the second task selecting window comprises a plurality of applications.

5. The task executing method of claim 3, further comprising steps of:
   after selecting the Q second tasks, displaying a second task sorting window;
   sorting the Q second tasks in the second task sorting window; and
   automatically executing the Q second tasks after sorting while the screen saver image exits.

6. The task executing method of claim 5, further comprising step of:
   canceling or adding at least one second task in the second task sorting window.

7. A task setting method adapted for a screen saver comprising steps of:
   opening a screen saver setting window;
   displaying a task setting region in the screen saver setting window, wherein the task setting region comprises N first tasks comprising a self-defined task, the N first tasks are tasks not involving any screen saver image capable of being automatically executed while a screen saver image starts, and N is a positive integer;
   selecting P of the N first tasks, wherein P is a positive integer smaller than or equal to N,
   selecting the self-defined task;
   displaying a first task selecting window, wherein the first task selecting window comprises a plurality of applications;
   displaying a first task sorting window;
   sorting the P first tasks in the first task sorting window; and automatically executing the P first tasks after sorting while the screen saver image starts.

8. The task setting method of claim 7, further comprising step of:
  canceling or adding at least one first task in the first task sorting window.

9. The task setting method of claim 7, wherein the N first tasks comprises a self-defined task, the task setting method further comprises:
  selecting at least one application in the first task selecting window.

10. The task setting method of claim 7, wherein the task setting region further comprises M second tasks, the M second tasks are capable of being automatically executed while the screen saver image exits, M is a positive integer, the task setting method further comprises steps of:
  selecting Q of the M second tasks, wherein Q is a positive integer smaller than or equal to M;
  displaying a second task sorting window; and
  sorting the Q second tasks in the second task sorting window.

11. The task setting method of claim 10, further comprising step of:
  canceling or adding at least one second task in the second task sorting window.

12. The task setting method of claim 10, wherein the M second tasks comprises a self-defined task, the task setting method further comprises steps of:
  selecting the self-defined task;
  displaying a second task selecting window, wherein the second task selecting window comprises a plurality of applications; and
  selecting at least one application in the second task selecting window.

13. A computer readable storage medium for storing a set of instructions, the set of instructions executing steps of:
  when a screen saver setting window is opened, displaying a task setting region in the screen saver setting window, wherein the task setting region comprises N first tasks comprising a self-defined task, the N first tasks are tasks not involving any screen saver image, and N is a positive integer; and
  if P of the N first tasks are selected, automatically executing the P first tasks while a screen saver image starts, wherein P is a positive integer smaller than or equal to N;
  when the self-defined task is selected, displaying a first task selecting window, wherein the first task selecting window comprises a plurality of applications;
  after selecting the P first tasks, displaying a first task sorting window;
  sorting the P first tasks in the first task sorting window; and
  automatically executing the P first tasks after sorting while the screen saver image starts.

14. The computer readable storage medium of claim 13, the set of instructions executing step of:
  allowing canceling or adding at least one first task in the first task sorting window.

15. The computer readable storage medium of claim 13, wherein the task setting region further comprises M second tasks, M is a positive integer, the set of instructions executes step of:
  if Q of the M second tasks are selected, automatically executing the Q second tasks while the screen saver image exits, wherein Q is a positive integer smaller than or equal to M.

16. The computer readable storage medium of claim 15, wherein the M second tasks comprises a self-defined task, the set of instructions executes step of:
  when the self-defined task is selected, displaying a second task selecting window, wherein the second task selecting window comprises a plurality of applications.

17. The computer readable storage medium of claim 15, the set of instructions executing steps of:
  after selecting the Q second tasks, displaying a second task sorting window;
  allowing sorting the Q second tasks in the second task sorting window; and
  automatically executing the Q second tasks after sorting while the screen saver image exits.

18. The computer readable storage medium of claim 17, the set of instructions executing step of:
  allowing canceling or adding at least one second task in the second task sorting window.

* * * * *